US006687573B2

(12) United States Patent
Egolf et al.

(10) Patent No.: US 6,687,573 B2
(45) Date of Patent: Feb. 3, 2004

(54) RECLOSER AND FUSE COORDINATION SCHEME

(75) Inventors: William M. Egolf, Apex, NC (US); David G. Hart, Raleigh, NC (US); Carl J. LaPlace, Raleigh, NC (US); Graeme N. McClure, Highett Victoria (AU)

(73) Assignee: ABB Technology AG, Zurich (CH)

( * ) Notice: Subject to any disclaimer, the term of this patent is extended or adjusted under 35 U.S.C. 154(b) by 60 days.

(21) Appl. No.: 09/803,839

(22) Filed: Mar. 12, 2001

(65) Prior Publication Data

US 2001/0034568 A1 Oct. 25, 2001

Related U.S. Application Data

(60) Provisional application No. 60/189,821, filed on Mar. 16, 2000.

(51) Int. Cl.$^7$ .............................. H02H 3/093; H02H 7/22
(52) U.S. Cl. ...................... 700/292; 700/293; 700/295; 361/71
(58) Field of Search ................... 361/71–75; 700/286, 700/292–298

(56) References Cited

U.S. PATENT DOCUMENTS

| | | | |
|---|---|---|---|
| 4,086,568 A | 4/1978 | Watts, Jr. et al. | 340/147 R |
| 4,466,071 A | 8/1984 | Russell, Jr. | 364/492 |
| 4,535,409 A | 8/1985 | Jindrick et al. | 364/481 |
| 4,994,934 A | * 2/1991 | Bouhenguel | 361/71 |
| 5,029,039 A | 7/1991 | Yeh | 361/59 |
| 5,091,616 A | 2/1992 | Ramos et al. | 200/146 R |
| 5,241,444 A | 8/1993 | Yeh | 361/59 |
| 5,303,112 A | 4/1994 | Zulaski et al. | 361/67 |
| 5,506,789 A | 4/1996 | Russell et al. | 364/492 |
| 5,550,751 A | 8/1996 | Russell | 364/492 |
| 5,568,399 A | * 10/1996 | Sumic | 700/293 |
| 5,638,296 A | 6/1997 | Johnson et al. | 364/492 |
| 5,650,728 A | 7/1997 | Rhein et al. | 324/543 |
| 5,659,453 A | 8/1997 | Russell et al. | 361/93 |
| 5,822,165 A | 10/1998 | Moran | 361/78 |
| 5,896,302 A | * 4/1999 | Goodpaster | 700/292 |
| 5,912,604 A | 6/1999 | Harvey et al. | 335/9 |
| 6,018,449 A | 1/2000 | Nelson et al. | 361/66 |

OTHER PUBLICATIONS

Toth L.S., et al. Enhanced Sectionalizing Through Proper Testing of Recloser Time Current Curves, *1994 Rural Electric Power Conference Papers Presented at the 38$^{th}$ Annual Conference*, Paper No. 94 B5, IEEE Rural Electric Power Confernece, Colorado Springs, Co., Apr. 24–26, 1994, pp. B5/1–7.

Witte, J.F., et al., "Computer–Aided Recloser Applications For Distribution Systems," *IEEE Computer Applications in Power*, IEEE Inc., New York, USA, vol. 5, No. 3, Jul. 1, 1992, pp. 27–32.

VR–3S Recloser 15–38kV brochure, ABB Distribution Automation Equipment Division, Raleigh, NC, Descriptive Bulletin 38–741–27 (Jun. 1999).

* cited by examiner

*Primary Examiner*—Leo Picard
*Assistant Examiner*—Douglas S. Lee
(74) *Attorney, Agent, or Firm*—Woodcock Washburn LLP

(57) ABSTRACT

An automatic power restoration device has a modifiable end point. The end point is indicative of the operational parameters of the automatic power restoration device. A user can modify the end point and thus the operational parameters of the automatic power restoration device. The end point can be modified according to the protection characteristics of other fault protection devices within a power system.

17 Claims, 3 Drawing Sheets

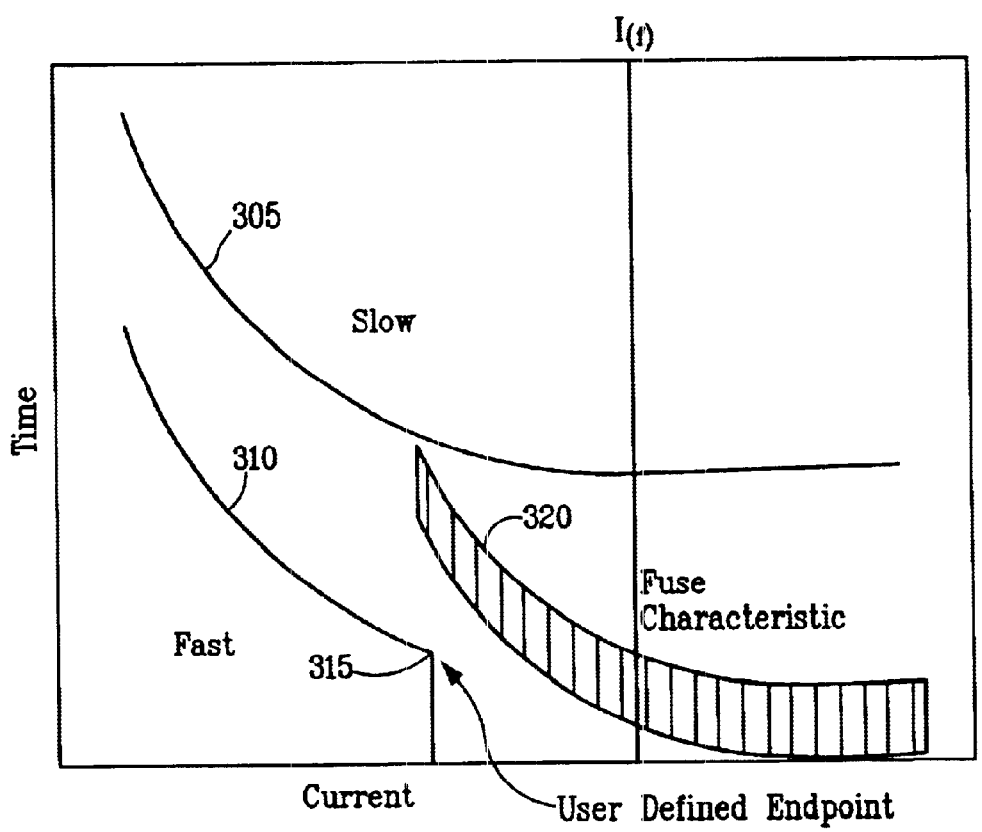

RECLOSER AND FUSE COORDINATION SCHEME

This Application claims benefit of U.S. provisional Application Ser. No. 60/189,821 filed Mar. 16, 2000.

FIELD OF THE INVENTION

The present invention relates generally to power distribution components, and more particularly, to automatic power restoration systems and methods for use in power distribution systems.

BACKGROUND OF THE INVENTION

The basic functions of a power system are to continuously maintain an adequate and reliable supply of electric power to customers. However, performing these functions is not always possible because various types of failures occur randomly and beyond the control of system engineers. Power system planners, designers, and operators are generally concerned with the reliability of their systems and the determination of realistic availability targets for their systems. Recently, this concern has been accentuated by the introduction of competition in the marketplace among utility companies. Now, utility companies are jockeying among themselves to provide distinguishable services in an effort to sustain existing customers and to attract new customers.

Residential customers and businesses alike are increasingly depending on power. From a simple toaster to complex manufacturing equipment, power is required by today's power customer in most of their day to day operations. Not surprisingly, as a result of the new competition and the importance of power to customers, power system operators are being asked to provide reliable, dependable, and more affordable power. Power system operators have taken notice since the consequences of long-term unavailability and persistent interruption of electric power could directly translate to a loss of power customers.

As a result, power system operators are constantly developing improved components for power distribution systems that will enhance the system's reliability. For example, many power utilities around the world use fuses on their lateral lines. In addition to fuses, utilities may employ an automatic power restoration device such as a circuit recloser or reclosing breaker. These devices generally operate by sensing overcurrents, time and interrupt currents, and reenergize a distribution line by reclosing automatically. If a fault in the power distribution system is permanent, the recloser locks open after a pre-set number of operations (usually three or four), isolating the faulted section from the main part of the systems. A recloser control device provides the intelligence that enables a recloser to sense overcurrents, select timing operations, time the tripping and reclosing functions, and lockout. The hydraulic control, an integral part of the recloser, is used in single-phase reclosers and the smaller rated three-phase reclosers. The electronic control is generally used in the single-phase reclosers and in higher rated three-phase reclosers. Such devices, however, should be appropriately programmed to coordinate in a predefined manner to ensure that the power distribution systems respond to line faults in accordance with expectations.

Generally, when reclosers are used in conjunction with fuses, they are configured in a variety of modes. For example, the recloser or reclosing breaker may be configured for a Fuse Saving mode or Fuse Clearing mode. In the Fuse Saving mode, the automatic circuit recloser or reclosing breaker operates a couple of operations faster than a fuse, trying to clear a momentary fault. If the fault is still present, the automatic circuit recloser operates more slowly than the fuse, enabling the fuse to clear. In the Fuse Clearing mode, the automatic circuit recloser is setup so that for a fault beyond any fuse in series with the recloser, it shall be cleared by the fuse without causing the recloser to close.

In operation, reclosers or reclosing breakers typically employ two curves for protection: an ANSI 50 and an ANSI 51 protection curve. These curves are typically referred to as slow and fast curves, respectively. Depending on the utility practice, these curves are coordinated with other protection devices, such as a fuse on the circuit. However, it is not always possible to properly coordinate the fuse curve and the recloser curve over the entire current range. Due to coordination limitations, there are frequent times when it is possible for a fault to occur that has sufficient magnitude to cause the fuse to melt (i.e., irreversible damage to the fuse), but not to clear the fault before the upstream protection (e.g., recloser) will respond.

It would thus be advantageous to develop apparatus and methods for providing automated restoration of power distribution systems that do not place the power restoration components at risk during a fault.

SUMMARY OF THE INVENTION

The present invention is directed to apparatus and methods for providing an automatic power restoration device with a programmable or modifiable end point. The end point is indicative of the operational parameters of the automatic power restoration device. A user can modify the end point and thus the operational parameters of automatic power restoration device.

In one embodiment of the present invention, the end point is determined according to the protection characteristics of other fault protection devices within a power system. This configuration prevents the automatic power restoration device from unnecessarily operating when another fault protection has previously isolated a fault. Such unnecessary operations of the automatic power restoration device cause excessive wear and tear to the automatic power restoration device as well resulting in unwanted operation.

BRIEF DESCRIPTION OF THE DRAWINGS

Automated power restoration devices and methods that accommodate the characteristics of fault protection devices of a power distribution system in accordance with the present invention are further described with reference to the accompanying drawings in which:

FIG. 3 is a diagram of exemplary current characteristics of a recloser operating in accordance with the present invention.

DETAILED DESCRIPTION OF INVENTION

Power Distribution Systems Overview

Figure 1:
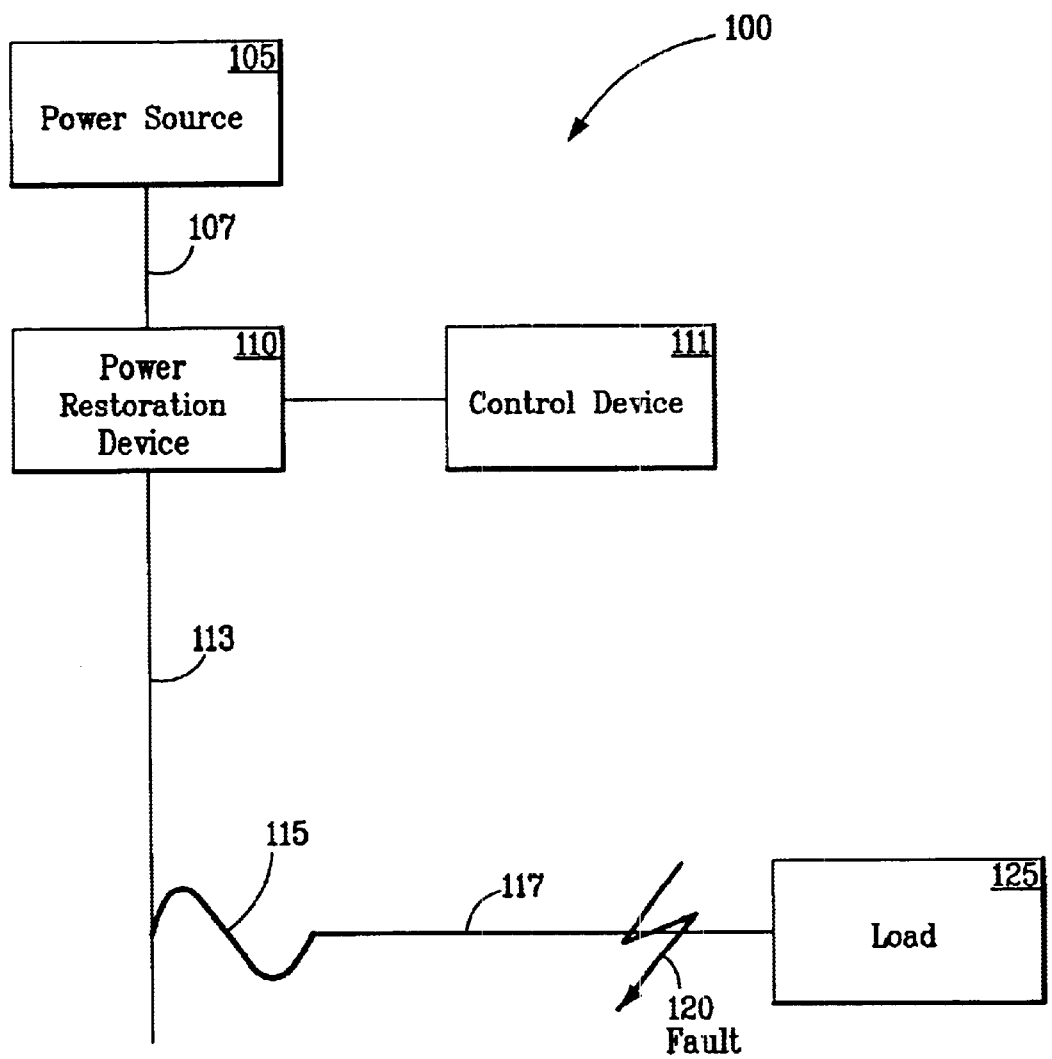
FIG. 1 is a block diagram of an exemplary power system employing an automated power restoration component and a fuse as fault protection devices in accordance with present invention.

Electrical transmission lines and power generation equipment must be protected against insulation faults and consequent short circuits, which could cause a collapse of the power system, serious and expensive equipment damage, and personal injury. Further, extensive power outages may cause angst among consumers that expect reliable and trustworthy utility service. It is the function of fault protection devices such as fuses and protective relays to assist in the isolation of line faults and initiate isolation by tripping circuit breakers. In addition, power distribution operators employ automatic power restoration components to automatically bring downed power distribution systems back on-line in the event of a protection fault or other system malfunction.

Automatic recloser devices are used in electrical distribution systems to protect high voltage power lines. Such devices are usually mounted to the poles or towers that suspend power lines above the ground. However, use with below ground systems is also known. The recloser device is used to minimize power distribution interruptions caused by transients or faults.

Typically, during a system disturbance, large increases in current, i.e., faults, will occur. Sensing a current increase, the recloser will open, thereby cutting off current flow in order to protect distribution system components and other equipment connected to the distribution system. Since many fault conditions are temporary, the recloser is designed to close after a short period of time, thereby establishing normal current flow. For example, during a thunderstorm, if lightning were to strike the distribution system, the power to one's home may be disrupted for a few seconds causing lights and appliances to turn OFF (recloser opening), then ON (recloser closing). Once the recloser closes, if it senses the continued presence of increased current, it will again open. Such cycling between open and closed may occur three times before the recloser remains open.

When used in conjunction with other protection devices, such as a fuse or protective relay, an automatic power restoration device may operate in two modes for example, Fuse Saving or Fuse Clearing. In the Fuse Saving mode, the automatic power restoration device operates faster than a cooperating fuse, trying to clear a momentary fault. In the event the fault is still present after the restoration device's attempts to restore the system, the automatic power restoration device operates more slowly than the fuse, allowing the fuse to clear. In the Fuse Clearing mode, the automatic power restoration device is configured so that a fault occurring beyond any fuse that is connected in series with such fault is cleared by the fuse without causing the recloser to operate.

Correspondingly, there are several types of fuses for use in power distribution systems, such as current limiting fuses and expulsion type fuses. A current limiting fuse, as the name suggests, is designed to limit current passing through the fuse. Alternatively, an expulsion fuse ultimately clears a fault by drawing an arc that extinguishes when the current goes through a zero crossing (i.e., every half cycle). This is generally achieved by using a metal filament that heats and melts with a known melting characteristic. When the filament melts, the end contacts are able to separate drawing an arc. The zero crossing of the current waveform then causes the arc to be extinguished.

Generally, for power distribution systems contemplating fuse coordination, the characteristics of the automatic power restoration device should relate to the cooperating fuse(s) such that proper operation and protection for the power restoration device is realized. For example, if a fuse clearing strategy is adopted, it is important that the total clearing time of the fuse is faster than the relay response time of the recloser. However, the coordination of a recloser and fuse becomes more involved when a fuse saving strategy is employed.

Simplistically, for an automatic power restoration device, it is desirable that the total operating time for the fast operations (i.e., fuse saving operation—fast curve characteristics) is faster than the minimum melting time of a given fuse. For the time-delayed operation (i.e., fuse clearing operation—slow curve characteristics), the response time of the power restoration device may be slower than the total clearing time of the fuse. A complication may arise when employing these schemes since the automatic power restoration device is typically configured for two fast and two time-delayed operations. Correspondingly, a fuse is a thermal device and its elements respond to an accumulative heat build up. Since the reclose time is sufficiently quick that the fuse does not completely cool down between recloser operations, coordination is desirable between the recloser's accumulative heating curve and the fuse minimum heating time.

In addition, it is not always possible to properly coordinate the fuse curve and the recloser curve over the entire current range maintained by the power distribution system. Due to such limitation, there are frequent times when it is possible for a fault to occur having sufficient magnitude to cause the fuse to melt (i.e., irreversible damage to the fuse), but not to clear before the upstream protection (e.g., automatic power restoration device) will respond.

The present invention provides a solution to complications arising in fuse coordination of power distribution systems. As described herein, the methods and apparatus of the present invention may be implemented as part of an automatic power restoration device having a programmable or modifiable end point. Such modifiable end point is adaptable to be coordinated with the operational parameters of cooperating fault protection devices in the power system.

Automatic Power Restoration Device Having a Modifiable End Point

FIG. 1 is block diagram of an exemplary power distribution system 100 in which the present invention may be embodied. A power source 105 is electrically coupled to automatic power restoration device 110 through transmission line 107 such that current flows through an automatic power restoration device 110, such as a recloser or reclosing breaker. Further, automatic power restoration device 110 is electrically coupled to fuse 115 through transmission line 113. Automatic power restoration device 110 is also coupled to and controlled by an automatic power restoration control device 111. Fuse 115, in turn, is electrically connected to load 125 through transmission line 117.

In operation, current flows from power source 105 through automatic power restoration device 110 to fuse 115 to load 125. As shown, fault 120 may occur on transmission line 117, thereby disrupting power distribution to load 125. Fault 120 may cause fuse 115 to clear the fault. Also, fault 120 may trigger automatic power restoration 110 device to operate. Whether fuse 115 or automatic power restoration device 110 operates first, responsive to the fault, depends on the configuration of automatic power restoration device 110.

An automatic power restoration device in accordance with the present invention is adaptable such that its response characteristics may be altered to accommodate for the fault response characteristics of cooperating protection components, such as fuse 115. That is, when implemented, the controls of automatic power restoration device 110 may be programmed such that the fault response algorithm is modified to respond to faults having currents that are less than currents capable of damaging downstream cooperating protection devices, such as fuse 115.

More particularly, for purposes of explanation, the automatic power restoration device or recloser 110 may be shown as having only one pole. Typically, the recloser has one pole connected to each phase of the transmission line 113. The transmission line 113 is shown as a single line (representing one phase), however, it is appreciated that transmission lines are generally three phases with an additional neutral. Consequently, reclosers typically have a pole for each phase.

The basic components of an automatic power restoration device such as a recloser are a high-speed circuit interruption device, overcurrent protection, trip logic, and automatic closing logic with an operation counter. When an overcurrent of sufficient magnitude (i.e., greater than a predetermined amount of current) flows through the recloser, the tripping action is initiated and a circuit interrupting contact within the affected pole(s) opens with an operation counter advancing one count. After a preset time delay, the recloser contacts are automatically closed, thereby re-energizing the associated power line. If the fault persists, this tripping and reclosing sequence is repeated a predetermined number of times, as set by a controller 111, until a lockout function is initiated. If the fault was transient and cleared during any period when the recloser was open, then the recloser will remain closed after a short time delay, reset to its original condition ready for the next operation.

An exemplary automatic power restoration device for use with the present invention is the VR-3S recloser manufactured and distributed by ABB Power T&D Company, Inc., Raleigh, N.C. Magnetic actuators open and close the recloser's main contacts.

More particularly, the automatic power restoration device 110 is controlled by a microprocessor-based controller 111 that contains software. There are two basic design areas that make up a microprocessor-based controller 111. The physical elements, such as integrated circuits, resistors, capacitors, displays, switches, and so forth, are called "hardware". Once constructed, they are not readily changeable. The second basic design area in the microcomputer includes computer programs and documentation. These elements are called "software" since they are readily changeable.

A microcomputer based on a microprocessor and associated memories and interfacing components is used in the controller 111 to process input signals in a manner appropriate to the basic requirement for a recloser control. The microprocessor performs the various arithmetic and logic functions of the control. In particular, the required logic circuits as well as capabilities for servicing are typically included.

Memory is provided for temporarily and/or permanently storing data. In a recloser, for example, this information would include line current magnitudes. Read only memory (ROM) is preferably electrically programmable for easy modification and is used for storing programming information. In a recloser controller, for example, the memory module contains command information including multiple time-current characteristic curves.

An exemplary control unit is the PCD2000 power control device manufactured and distributed by ABB Power T&D Company, Inc., Raleigh, N.C. The control device can provide an interface for remote communication with SCADA systems using MODBUS RTU, MODBUS ASCII, and DNP 3.0 protocols. The controller can be programmed to implement other protocols. Ports are available for external links through a radio, modem, or direct fiber optic communications, for example.

Typical command information for a controller includes first time current characteristics for phase and ground currents which usually result in the more rapid tripping of the automatic power restoration device, and second time current characteristics for phase and ground currents which usually result in the automatic power restoration device remaining closed longer under fault conditions.

Figure 2:
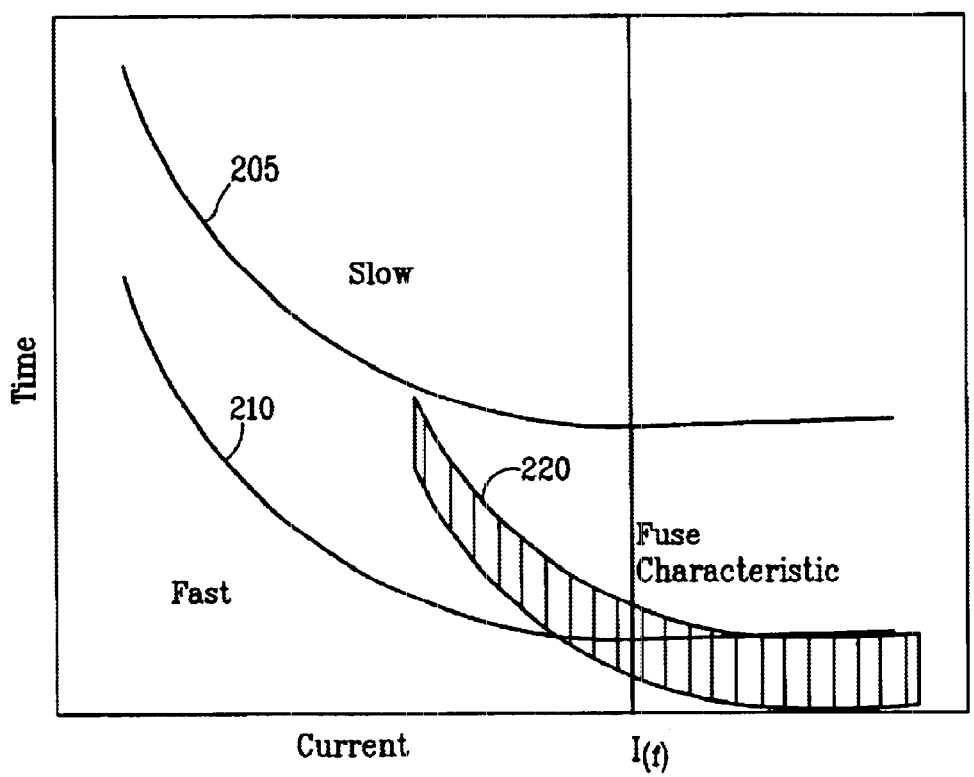
FIG. 2 is diagram of a voltage and current characteristics of a recloser operating in a Fuse Clearing Scheme or a Fuse Saving mode.

FIG. 2 shows exemplary current characteristics of fuse 115 and the fast and slow operations of automatic power restoration device 110 consistent with the prior art. Depending on how automatic power restoration device 110 is configured, the automatic power restoration device 110 maintains different characteristics. As shown in FIG. 2, the current characteristics show decreasing current through fuse 115 and automatic power restoration device 110 with increasing time. Automatic power restoration device 110 is described by current/time curves 205 and 210. Current curve 205, labeled "slow" curve, describes a time-delayed configuration for automatic power restoration device 110, in line with a Fuse Clearing mode described above. Preferably, when operating in this mode, automatic power restoration device 110 allows fuse 115 to address fault 120 first. Alternatively, current curve 210 illustrates "fast" curve characteristics for automatic power restoration device 110, one that is line with the Fuse Saving scheme described above. Preferably, in this scheme, automatic power restoration device 110 will attempt to clear fault 120 before allowing fuse 115 to be tripped. However as shown in FIG. 2, at point $I_{(f)}$, the fast operating curve of automatic power restoration device 110 may not properly coordinate with the fuse characteristic. Under this condition, the user does not know if the fuse will clear the fault, if the recloser will clear the fault, or if both will operate, as this is dependent on the fault current. It is also possible that the fuse may be damaged, but the recloser will clear the fault, and this will affect future coordination.

In other words, if fault current $I_{(f)}$ appears in power distribution system 100, such fault will damage the fuse (because $I_{(f)}$ falls within the operational parameters of fuse 115). Additionally, fault current $I_{(f)}$ will cause the automatic power restoration device 110 to attempt to clear the fault. As may be appreciated, the automatic power restoration device 110 may operate redundantly if the fuse clears the fault. Thus, such operation of the automatic power restoration device 110 is superfluous, and removes more customers than is necessary.

FIG. 3 shows exemplary current characteristics of fuse 115 and of automatic power restoration device 110 in accordance with the present invention. As shown in FIG. 3, current decreases through fuse 115 and automatic power restoration device 110 with increasing time. Automatic power restoration device 110 maintains slow current curve 305 and fast current curve 310. In operation of power distribution system 100, automatic power restoration device 110 employs slow curve 305 to allow fuse 115 to first respond to fault 120. Alternatively, automatic power restoration device 110 employs fast current curve 310 when addressing fault 120 first. Similar to FIG. 2, fuse 115 maintains a current characteristic curve 320. However, unlike the current curve characteristics shown in FIG. 2, the fast current curve 310 maintains a programmable or otherwise modifiable end point 315 according to the present invention. Such modifiable end point 315 has a current value that is less than the current response characteristic curve 320 of fuse 115. Thus, in operation, if automatic power restoration device 110 is to address a fault using the configured fast current curve 310 (i.e., automatic restoration device 110 tries to clear fault 120 before allowing fuse 115 to address fault 120), it will only address faults that have a current magnitude less than that value which would cause irreversible damage to fuse 115.

In other words, by providing an end point 315 on automatic power restoration device 110 and setting such modifiable end point below the operating parameters of another fault protection device, in this case, fuse 115, the automatic power restoration device 110 will not operate beyond such end point. Therefore, with reference to FIG. 3, if fault current $I_{(f)}$ appears in power distribution system 100 with a recloser having modifiable end point 315, the fault will blow the fuse, thereby effectively isolating the fault. The automatic power restoration device 110, however, will not operate (i.e., open and close) because $I_{(f)}$ is greater than (outside of) the operational parameters of the automatic power restoration device 110. In contrast, if the automatic power restoration device 110 did not have a modifiable end point 315, as shown conventionally in FIG. 2, the automatic power restoration device 110 would operate to no avail.

By providing such modifiable end point 315 and preventing the superfluous operation of the automatic power restoration device 110, consumers of electricity from power distribution system 100, who are not served by the fuse 115, will not experience a power outage caused by the unnecessary operation of the automatic power restoration device 110. Additionally, a reduction in the number of unnecessary automatic power restoration device 110 operations yields lowers maintenance costs and reduces wear and tear associated with such operation.

In sum, the present invention provides an automatic power restoration device and methods for use in power distribution systems that accommodate for the characteristics of cooperating fault protection devices. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

For example, the present invention may be implemented in a variety of power distribution system configurations. The various techniques described herein may be implemented in hardware or software, or a combination of both. Preferably, the techniques are implemented in power grade hardware executing instructions that each include a processor and output control device. The instructions are performed by the microprocessor to control one or more components of the power distribution system. The instructions can be implemented in any computing language such as assembly or machine language.

Additionally, in one embodiment of the invention, the programmable or modifiable end point may be programmed or modified by the user of the automatic power restoration device. However, the end point can be modified in other ways, such as, for example, software stored in the automatic power restoration control device may monitor certain operating characteristics and modify the end point accordingly without departing from the scope of the invention.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention as defined in the following claims.

What is claimed is:

1. An automatic power restoration system connected to a power system comprising:
    an automatic power restoration device; and
    a control device, the control device comprising:
        a microprocessor;
        a memory; and
        a software application supporting a programmable end point, the end point indicative of the operational characteristics of the automatic power restoration system and programmable to coordinate automatic power restoration device curve characteristics with fault protection device curve characteristics by modifying the end point of the automatic power restoration system.

2. The automatic power restoration system of claim 1, wherein the programmable end point is user-programmable or automatically programmable by the software application responsive to conditions in the power system.

3. The automatic power restoration system of claim 1, wherein the operational characteristics of the automatic power restoration device are coordinated with operational parameters of a the fault protection device in a the power system.

4. The automatic power restoration system of claim 3, wherein the fault protection device is a fuse.

5. The automatic power restoration system of claim 3, wherein the operational characteristics are coordinated with the operational parameters of the fault protection in order to prevent the automatic power restoration system from operating within the operating parameters of the fault protection device.

6. A power distribution system having power distribution equipment, the system comprising:
    at least one automatic power restoration system for restoring power to the power distribution equipment, wherein the automatic power restoration system supports a programmable end point indicative of the operational characteristics of the automatic power restoration system;
    at least one fault protection device capable of ceasing power to the power distribution equipment and having operational parameters; and
    at least one automatic power restoration control device capable of coordinating automatic power restoration system curve characteristics with fault protection device curve characteristics by modifying the end point of the automatic power restoration system.

7. The power distribution system of claim 6, wherein the end point is modified in accordance with the operational parameters of the fault protection device.

8. The power distribution system of claim 6, wherein the operational characteristics of the automatic power restoration system are coordinated with operational parameters of the fault protection device in order to prevent the automatic power restoration system from operating within the operating parameters of the fault protection device.

9. The power distribution system of claim 6, wherein the programmable end point is programmable by a user.

10. The power distribution system of claim 6, wherein the programmable end point is automatically programmable responsive to conditions in the power distribution system.

11. The power distribution system of claim 6, wherein the fault protection device is a fuse.

12. A method for distributing electrical power in a power distribution system having power distribution equipment, comprising:

providing at least one automatic power restoration system for restoring power to power distribution equipment, wherein the automatic power restoration system supports a programmable end point representing a point at which the automatic power restoration system ceases to provide power to the power distribution equipment;

providing at least one fault protection device capable of opening a conductive line in the power distribution system and having operational parameters, and coordinating automatic power restoration system curve characteristics with fault protection device curve characteristics by modifying the end point of the automatic power restoration system.

13. The method of claim 12, wherein modifying the end point comprises adjusting the end point such that the end point is less than the operational parameters of the fault protection device.

14. A computer readable medium encoded with computer-executable instructions to perform the method of claim 12.

15. The computer readable medium of claim 14, further comprising computer-executable instructions to modify the end point of the automatic power restoration system.

16. The computer readable medium of claim 15, further comprising computer-executable instructions to adjust the end point such that the end point is less than the operational parameters of the fault protection device.

17. A method for reducing the operational cost of an automatic power restoration device, the method comprising:

providing at least one automatic power restoration device for restoring power to power distribution equipment, wherein the automatic power restoration device supports a programmable end point representing a point at which the automatic power restoration device ceases to provide power to the power distribution equipment;

providing at least one fault protection device capable of opening a conductive line in the power distribution system; and coordinating automatic power restoration device curve characteristics with fault protection device curve characteristics by modifying the end point of the automatic power restoration device, wherein the modifiable end point of the automatic power restoration device is modified to coordinate with operational parameters of the fault protection device such that the operational characteristics of the automatic power restoration device do not coincide with the operational parameters of the fault protection device.

* * * * *

UNITED STATES PATENT AND TRADEMARK OFFICE
CERTIFICATE OF CORRECTION

PATENT NO. : 6,687,573 B2
DATED : February 3, 2004
INVENTOR(S) : William M. Egolf et al.

It is certified that error appears in the above-identified patent and that said Letters Patent is hereby corrected as shown below:

Column 8,
Line 28, delete two occurrences of "a the" and insert therefor -- the --

Signed and Sealed this

Thirteenth Day of April, 2004

JON W. DUDAS
*Acting Director of the United States Patent and Trademark Office*